Aug. 2, 1960 G. P. BAFOUR ET AL 2,947,357
KEYBOARDS FOR AUTOMATIC COMPOSING MACHINES
Filed June 12, 1957 8 Sheets-Sheet 3

INVENTORS:
GEORGES P. BAFOUR
ANDRÉ R. BLANCHARD
FRANÇOIS H. RAYMOND
By A. John Michel
ATTORNEY

Fig. 4

Aug. 2, 1960    G. P. BAFOUR ET AL    2,947,357
KEYBOARDS FOR AUTOMATIC COMPOSING MACHINES
Filed June 12, 1957    8 Sheets-Sheet 5

Fig. 5

INVENTORS:
GEORGES P. BAFOUR
ANDRÉ R. BLANCHARD
FRANÇOIS H. RAYMOND
By A. John Michel
    ATTORNEY

Fig.8

Aug. 2, 1960     G. P. BAFOUR ET AL     2,947,357
KEYBOARDS FOR AUTOMATIC COMPOSING MACHINES
Filed June 12, 1957     8 Sheets-Sheet 8

Fig.9

INVENTORS:
GEORGES PIERRE BAFOUR
ANDRÉ R. BLANCHARD
FRANÇOIS H. RAYMOND
By A. John Michel
ATTORNEY

2,947,357
Patented Aug. 2, 1960

2,947,357
KEYBOARDS FOR AUTOMATIC COMPOSING MACHINES

Georges Pierre Bafour, 27 Rue de la Convention, and André René Blanchard, 57 Rue Vercingetorix, both of Paris 15, France, and François Henri Raymond, Saint-Germain en Laye, France. (138 Blvd. de Verdun, Courbevoie, France)

Filed June 12, 1957, Ser. No. 666,265

Claims priority, application France June 20, 1956

22 Claims. (Cl. 164—112)

The present invention relates to keyboards for automatic composing machines as used in automatic composing plants for printing texts.

There are known composition systems for printing texts in which the typing of the texts to be printed also serves for perforating or otherwise marking a band or tape or a recording medium which is later used in a composing machine for printing these texts. Such a system is described in our United States Patent No. 2,762,485 which claims the priority of an application filed in France on March 24, 1954.

One of the objects of the present invention is to make it possible to use for such typing of texts a typewriter preferably of the kind known as electrical typewriter, the keyboard of which has been adapted to the requirement of automatic composing of texts. This is accomplished by the provision thereon, in addition to a conventional keyboard, of one or several auxiliary keyboards with one or more sets of auxiliary keys in order to increase the amount of information contained in the texts with additional information elements, in particular with "service information" used for the composition of texts.

Another object of the invention is to realize this increase in the capacity of the keyboard, designed to make available a number of characters or signs much higher than that provided by the keys of an ordinary typing machine, preferably without adding character bars and without increasing the dimensions of the set of characters of the machine.

According to a feature of the invention, there is associated with the aforementioned keyboards a recording device such as a perforator adapted to mark a tape or recording medium according to a predetermined code corresponding to the keys depressed on either the main keyboard or the so-called "service keyboard," or in a set of additional keys, hereinafter termed "collateral keys," which serve to give a somewhat modified significance to certain associated symbols of the main keyboard.

There is also provided in accordance with the invention a keyboard system adapted to control a recording mechanism such as a perforator upon each depression of keys and also to cause the appearance on a sheet of paper, in a manner known per se, of the characters of signs corresponding to the types which have been depressed and registered. As, however, the number of character bars is chosen preferably smaller than the number of keys of the keyboard, we prefer to provide, according to another feature of the invention, means to cause the cooperation with the said keyboard of a device permitting to actuate a single character bar either with a key of the "collateral keyboard" or with a key of the "service keyboard" as well as a device permitting to characterize on the sheet of paper the characters and signs in a manner dependent upon the actuation of the collateral keys or of the keys of the "service keyboard."

According to another aspect of the invention, there are added to one of the keyboards, e.g. the "service keyboard," three keys entitled respectively "lower case," "large capitals" and "small capitals"; these keys control by means of a shifting device the relative position of the set of characters and of the carriage of the machine on the one hand, and by means of a selection device the selective characterization of subsequently actuated symbols, i.e. characters and signs, on the other hand. The depression of the "lower case' keys will for example cause a certain relative positioning of two co-operating elements, namely the carriage and the set of character-bearing members, whereas the depression of either of the other keys ("large capitals" and "small capitals") will place these elements in another predetermined relative position. The depression of any one of these keys will always cause a particular relative positioning of the carrier and of the set of characters but this relative positioning will subsequently be reversed in the case of at least one of these keys, for example of the "lower case" key, in response to a confirmation actuation resulting from the depression of another key of the keyboard, the arrangement thus being similar to the locking or non-locking capital shift in an ordinary typewriter. If the carriage is not to be locked in shifted position, the return of the keys to the rest position will preferably give rise to an "unshift" code or the operator will have to actuate immediately the service keys corresponding to cancellation of shift.

The depression of any one of the three keys corresponding to the actuation of the device for the selective characterization of subsequently typed characters will, in a system incorporating features of the invention, results in a change of color of the typed character, as by the use of a multicolor ribbon adapted to be moved by the above-mentioned device into positions of registry of differently colored tracks or zones thereof with the type faces of the character bars and/or the operation of auxiliary means which cooperate selectively with the ribbon in order to modify the appearance of the later-typed characters, as by introducing gaps or additions which render perceptible the category of which they form part without materially impairing the legibility of the character. A means of characterizing the type other than by a change of color is for example the interposition of a grid between the paper and the character to be typed, said grid being positionable to avoid the printing of the whole outline of a character on the paper or, conversely, to add marks to some parts of the character.

According to another feature of the invention, the effects of the depression of at least one of the three above-mentioned keys for the characterization of the following signs or characters may be co-determined by the category of these signs or characters. For example, during a first period which takes place at the same time as the depression of any one of the three selector keys, the multicolored (e.g. red-black-green-blue) ribbon is always raised into the red position and comes back to a position selected for example as follows:

If the key depressed is a "lower case" key or a "large capitals" key, the ribbon is brought to the "black" position (if not already in that position) or remains in that position when there is later depressed a key other than a collateral key of the main keyboard. If it is one of these collateral keys which is depressed, the ribbon momentarily presents its blue track but does not remain in that position.

If the key depressed was a "small capitals" key, the ribbon is shifted to present its green track and remains there up to the depression of either of the two other selector keys. It is no longer possible to use the collateral keys of the main keyboard as long as the ribbon is in the "green" position.

It should be understood that this example is given only by way of illustration of the possibilities afforded from this point of view by the present invention.

It should be noted that the typing of each one of the three selector keys, i.e. "lower case" key, "large capitals" key and "small capitals" key, will automatically cause the marking of a corresponding code onto the code-recording medium (e.g. tape) of the machine.

According to another aspect of the invention and in association with the features of the invention described above, there is provided means to insure a systematic characterization of the signs and characters in response to the depression of keys of the service keyboard distinct from the characterization given to these same signs and characters upon the depression of keys of the main keyboard and also of the collateral keys. It will be remembered, however, that the distinctive characterization identifying these latter keys can be applied only to one character at a time and could not be maintained between two successive depressions of these keys. In the above example, there has been provided the red color for characterizing the signs and characters of the service keyboard, the black and green colors being reserved for the main keyboard as stated.

To sum up, in a keyboard system according to the present invention the interpretation to be given on the typographic proof to the various signs and characters is made a function of the particular characterization, the color for instance, with which they appear in the typed text.

In the coded recording, on the other hand, there is provided a distinct code for each key except possibly certain cases such as the keys for the "em" and "half-em" (or "en") spaces, each one of these special collateral keys occurring twice on the keyboard. Each pair of such doubled keys causes the same numerical code on the recording medium but the depression of one key, associated with a spacing bar, does not cause the appearance of the typed character on the proof whereas the depression of the other key causes thereon the printing of a predetermined character but with the characterization of a collateral key, for example on the blue-colored track in the example considered above. It is therefore possible at will to cause or not the appearance on the copy of a trace of a particular nature for the space or "blank" of the composition which has been typed.

To facilitate the description of the invention, reference will now be made to the accompanying, somewhat schematic drawing in which.

From these illustrations and from their descriptions it will be possible to derive without further explanation any technological alternative for practicing the invention and of course such alternatives and modifications are within the scope of the present invention.

Figure 1:
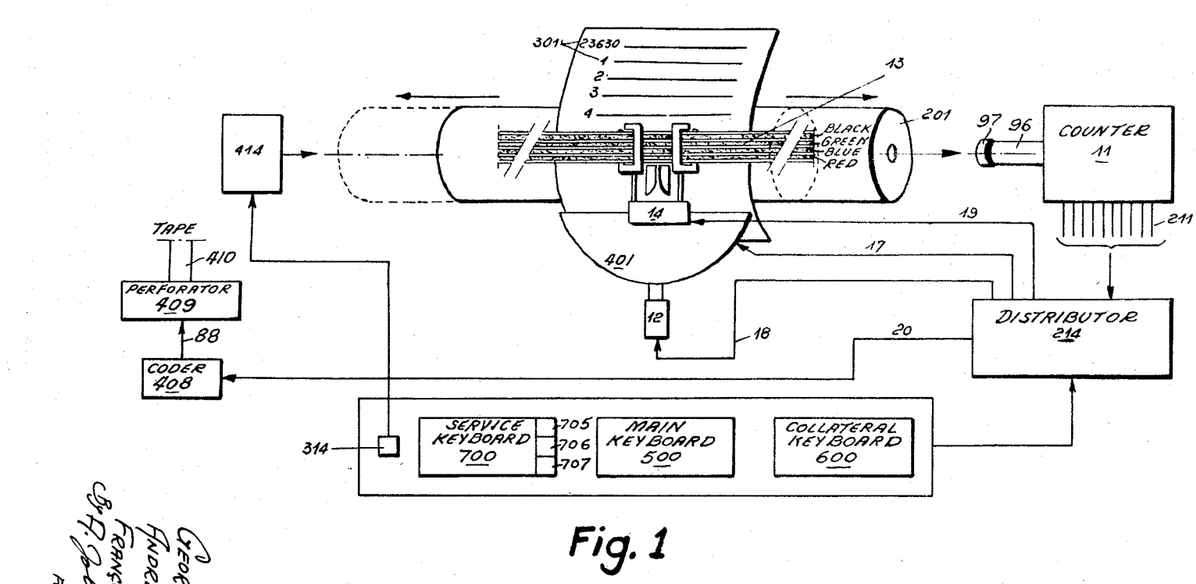
Fig. 1 shows an embodiment of the invention.

In Fig. 1 there is shown, schematically represented, an embodiment of the invention in which a bank of keys for operating a set of type faces 401, carried on individual character bars 37 (Fig. 3) in the usual manner, is divided into three parts, namely a main keyboard 500 containing the usual alphabetical and numerical keys, a keyboard 600 encompassing the collateral keys and a keyboard 700 consisting of service keys. In the latter there are indicated three subdivisions constituted respectively by the "small capitals" key 705, the "large capitals" key 706 and the "lower case" key 707. There is also indicated at 314 a control key for carriage return and for advance of the roller which acts directly on a mechanism for controlling these effects, indicated generally at 414.

The illustrated assembly of keyboards and character bars is adapted to produce a typewritten copy of the codes entered on the recording medium which is simultaneously recorded on a perforated tape 410 by means of a perforator 409 controlled by a coder 408. The coder is electrically connected to the keyboard by means of an electric distributor 214. The coded message and also the typed copy will comprise therefore the text to be printed and at the same time the service information concerning this text. It will also comprise, in the embodiment described, numerals corresponding to each line of the typed copy. A numbering line counter 11 is actuated by the advance movement of the roller 201 and indicates the number of the line in a way that will be described later. The counter 11 is also connected by electric leads 211 to the distributor 214 and will therefore act on the coder 408. It may be noted here that this distributor has four sets of leads. The first, 17, extends to the set of character bars bearing the type faces 401. The second, 18, terminates at the mechanism 12 for relative vertical movement between the character bars and the carriage whereas the third, 19, leads toward the mechanism 14 for shifting the colored track of the ribbon. The fourth output lead 20 is connected to the coder 408. The roles of these output leads will be explained later.

The typewriter ribbon 13 comprises, in the illustrated embodiment, several tracks of various colors. The vertical movement of this multicolor ribbon, by which it is placed in front of a character to be typed, is controlled by the track-changing mechanism 14. This mechanism is controlled by means of the distributor 214, in response to the operation of any of the keys of the main keyboard 500, the collateral keyboard 600 and the service keyboard 700, in a manner to be described hereinafter.

The elevation of the type faces 401 to produce capital typewritten letters is dependent on the mechanism 12 actuated from the keyboard assembly by means of the distributor 214.

The assembly represented in Fig. 1 permits therefore to produce on the one hand a typed copy, the lines 301 of which are consecutively numbered, and on the other hand a perforated tape 410 comprising in code form the information pertaining to the copy. Each of these records comprises not only the text to be printed but also the service information furnished through the service keyboard 700. On the typewritten copy obtained, the text and the service information are interlaced and the latter is distinguished from the text by its different appearance, in this case its distinct color.

This result may be obtained for example by means of the arrangements which will be now described.

Except for special cases to be explained later, each key 15 of the keyboard assembly is associated with a pair of electric contacts 16 which are closed by the depression of the key, see Fig. 2. The key 15 is depressed against the action of a spring 215 connected to ground. One of the contacts 16 is fixed to the bar of key 15 by, for example, soldering or brazing, being thus grounded by the spring 215. The other contact 16 is resiliently supported by and in conductive contact with a spring 216 which is fixed and connected to a conductive support 218 insulated from ground by means of an insulating member 217. Upon each depression of the key 15, therefore, electric ground is applied through respective rectifiers 219 to the four outgoing wires 17 to 20 which, multipled within the distributor 214 with corresponding wires from other keys, represent the aforedescribed output leads of the distributor as shown in Fig. 1.

Figure 2:
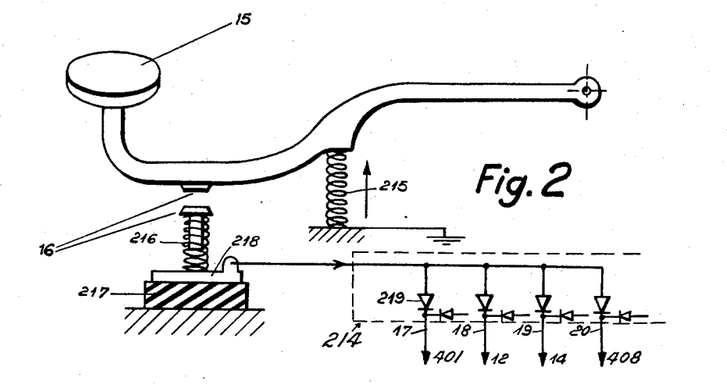
Fig. 2 shows details of a key of the keyboard.
Figure 3:
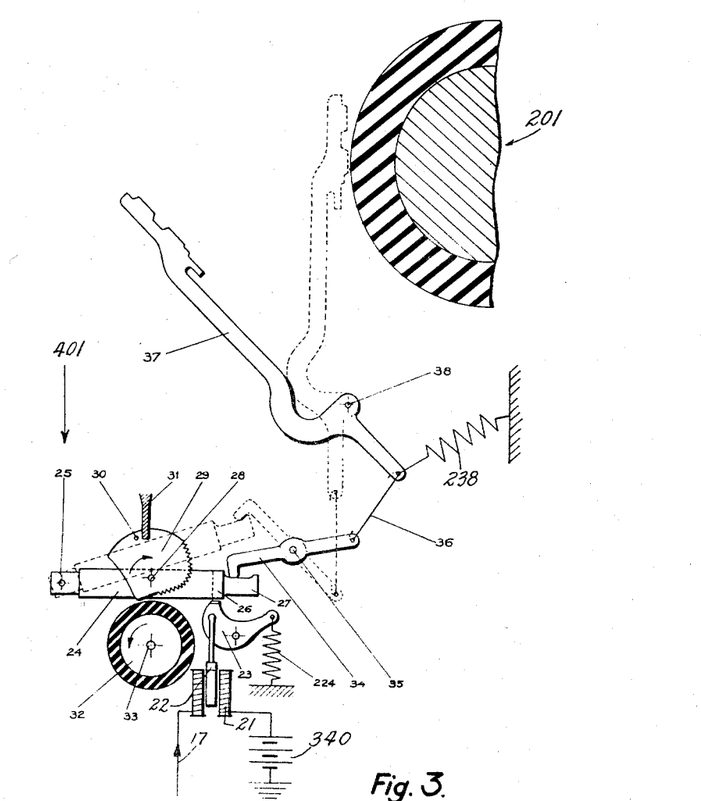
Fig. 3 shows details of a character bar.

A typical arrangement for controlling a character bar 37 is illustrated in Fig. 3. When the actuation of key 15, Fig. 2, has applied a ground to the wire 17, this ground closes the circuit to a battery 340 through an electromagnet 21 so that it will attract its armature 22 during the time this wire remains grounded. The armature or plunger 22 is connected to a crescent-shaped abutment 23 which is momentarily rotated about a pivot against the action of a resetting spring 224. This temporary pivoting movement of crescent 23 causes the actuation of the character bar 37 as follows: a bar 24, adapted to pivot upwardly from a substantially horizontal position around a fulcrum 25 provided at one of its extremities, rests normally with a contact portion 26 on the upper part of crescent 23. At its other extremity, adjacent portion 26, the bar 24 is provided with a slightly reduced portion 27. In its center, the bar has a transverse pin 28 projecting from it. A cam 29 is mounted freely on this pin about which it may complete a whole revolution. In its rest position, the cam 29 is prevented from rotating by a stud 30 abutting against the lower end of a tooth 31 of a comb which comprises as many teeth as there exist mechanisms similar to the one presently described, i.e. as there are character bars to be actuated. As the crescent 23 swings counterclockwise under the control of the electromagnet 21, it withdraws its support from the contact portion 26 and the bar 24 drops until the cam 29 comes into contact with a rubber-rimmed roller 32 rotating at constant speed about its axis 33. The roller is now free to drive the cam since stud 30 may pass under the tooth 31, this action being promoted by the provision of a notched contour on at least a part of the cam, as shown. The cam is so shaped that the bar 24 will be raised progressively, thus permitting the crescent 23 to take up its rest position under the action of its restoring spring 234 upon deenergization of magnet 21. After one revolution, cam 29 stops as stud 30 again approaches the tooth 31. Meanwhile, the upward swing of bar 24 has caused the clockwise rotation of a lever 34 about its axis 35, this lever, by exerting traction on a rod 36, actuating the character bar 37 which pivots about its axis 38, against the force of a spring 238, to type the desired character by striking the carriage 201 in the position indicated in dotted lines. Toward the end of the revolution of cam 29, bar 24 returns to normal and bar 37 falls back to its rest position.

Figure 4:
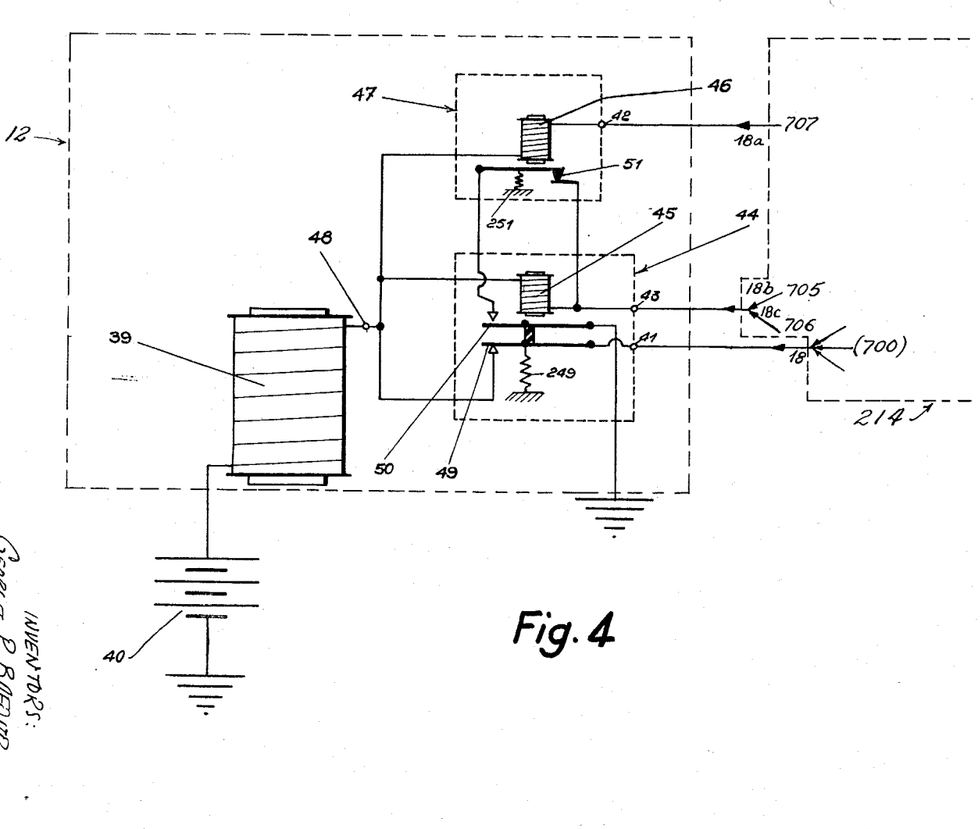
Fig. 4 shows details of the mechanism controlling the vertical displacement of the vertically shiftable element of the machine, i.e. the carriage or the set of characters, in order to obtain the typing of capital or lower-case letters.

A device for relatively shifting the type faces and the carriage to type optionally capital or small letters is schematically represented in Fig. 4 which shows the mechanism 12 and its electrical control circuits. The raising of the carriage is effected by an electromagnet 39 having one terminal connected to battery 40 and the other terminal 48 to switching relays 44 and 47 arranged as follows:

Three incoming terminals 41, 42 and 43 are provided. The terminal 41 is connected to the distributor lead 18 to which are multipled corresponding wires of all the keys of the service keyboard 700, with the exception of keys 705, 706 and 707 thereof. The terminal 42 is connected to the corresponding wire 18a of the "lower case" key 707. The terminal 43 is connected to the wire 18b of the "small capitals" key 705 and to the wire 18c of the "large capitals" key 706 of the service keyboard.

The terminals 41 and 43 lead to the winding 45 of relay 44. The terminal 43 is connected directly to the winding whose other terminal is tied to a terminal 48 of the electromagnet 39. The circuit of terminal 41 extends through an armature 49 of relay 44, and its back contact to the terminal 48. The armature 49 is mechanically coupled with a grounded second armature 50 of the same relay. The front contact of the armature 50 is connected to the armature 51 of relay 47 whose winding 46 has one of its terminals connected to terminal 42 and the other to terminal 48. The back contact of armature 51 is connected to terminal 43. The armatures 49, 50 of relay 44 and the armature 51 of relay 47 are provided with respective resetting springs 249 and 251.

The operation of the device is as follows:

If an impulse originates from any of the keys of the service keyboard 700 other than the keys 705, 706 and 707, the system is actuated through terminal 41. Armature 49 being on its back contact, the electromagnet 39 is energized and the carriage is lifted with respect to the set of type faces. The service signal corresponding to the depressed key is impressed as a capital letter. As soon as the impulse ceases, the electromagnet 39 is no longer energized and the element controlled by it, be it the carriage or the set of type faces, returns into the position "lower case."

If an actuating impulse arrives from "lower case" key 707, it reaches terminal 42 and energizes the electromagnet 39 through the winding 46; the sign chosen to denote "lower case" is impressed as a capital letter. Simultaneously, the front contact of armature 51 is opened, thus preventing any spurious switching operation. As soon as the impulse has ceased, the electromagnet 39 is no longer energized and the above-mentioned controlled element comes back into the "lower case" position as required.

If an impulse originates from either key 705 ("small capitals") or key 706 ("large capitals"), it reaches relay 44 through terminal 43. The electromagnet 39 is again energized, this time through winding 45, so that the chosen sign denoting "small capitals" or "large capitals," respectively, is impressed in capital letters. In this operation, however, a supplementary function is accomplished. The winding 45 being energized, the back contact of armature 49 is opened whereas the front contact of armature 50 is closed. The front contact of armature 51 remaining closed, the winding 45 is connected to ground through the armatures 50 and 51 in series. Since terminal 48 is constantly connected to the supply source 40 through electromagnet 39, the latter and the winding 45 remain continuously energized. Accordingly, the controlled element, that is the carriage or the set of type faces, will now remain indefinitely in the position "capital letters."

If, while this condition prevails, one depresses any key of the service keyboard other than the "lower case" key 707, no change in the circuit of Fig. 4 occurs as the corresponding impulse arrives either at terminal 43, thus producing no new effect since relay 44 is locked energized, or at terminal 41, this being equally ineffectual since the contact of armature 49 is opened.

If, on the other hand, "lower case" key 707 is depressed at this time, an impulse arrives through terminal 42. This impulse has the effect of opening the contact of armature 51 through the energization of winding 46. Now the winding 45 has its circuit interrupted so that, in turn, armature 50 opens its contact, armature 49 makes and the system returns to its rest position. Besides, the impulse received at 42 also energizes the electromagnet 39 so that the sign "lower case" is correctly impressed in capital letters. It is only afterwards that the carriage or the set of type faces comes back into the position "lower case" where it subsequently remains for an indefinite period.

Figure 5:
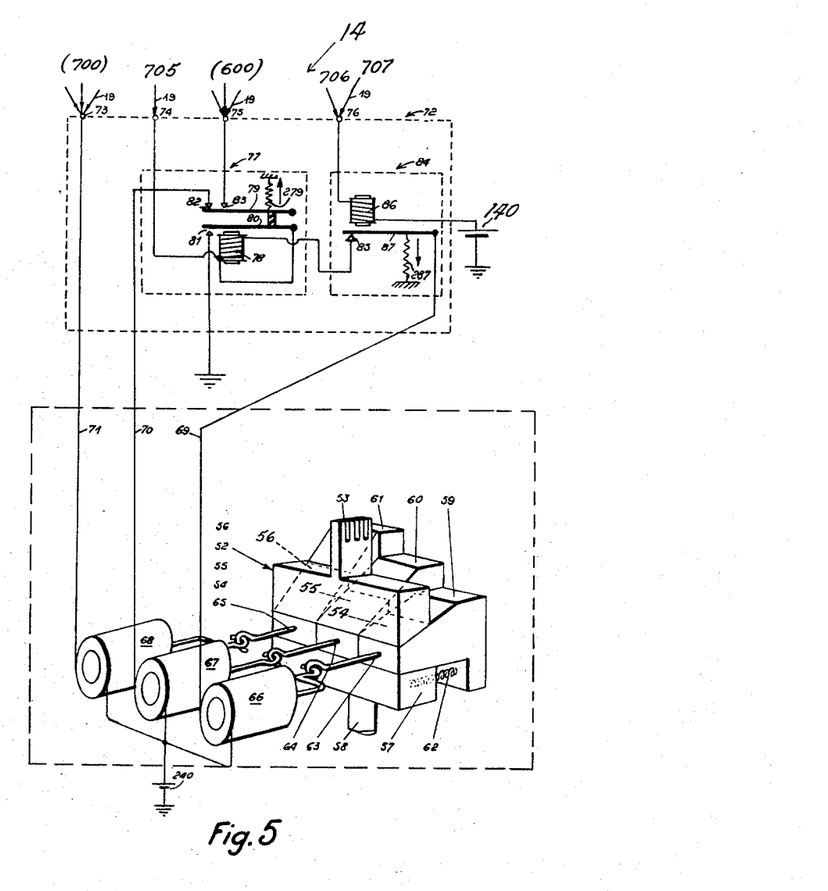
Fig. 5 shows details of the control for the vertical displacement of the ribbon according to the wanted color or track of the ribbon.

A device for effecting a shift of the multicolored ribbon 13 during the typing of characters is shown schematically by way of a non-limiting example in Fig. 5.

A ribbon-carrying member 52 is shaped, at its upper part, into a comb 53 into which is threaded the multicolored ribbon 13 (not shown in Fig. 5) which, as illustrated in Fig. 1, comprises for instance four tracks, respectively black, green, blue and red, staggered from the upper to the lower part of the ribbon.

The base of member 52 is shaped to present three slopes 54, 55 and 56 of equal widths and of progressively increasing steepness. The member 52 rests, through the intermediary of three wedges 59, 60 and 61, on a mobile support 57 actuated by a rod 58. The rod 58 is moved by a conventional mechanism for raising the ribbon of a typewriter only during actuation of a character bar, thus affording an unobstructed view of the typed text at all other times.

Each of the wedges 59, 60 and 61 has a horizontal base surface slidably resting on the upper surface of the support 57. Each one is urged rearwardly by a respective spring 62 (only one shown) into a position in which the lowest part of its sloping upper surface contacts the corresponding bottom slope of member 52. In this condition, the member 52 is in its lowermost position closest to support 57. It is in this position that the black top track of the multicolored ribbon 13 is effective when a key is depressed on the keyboard.

The wedges 54, 55 and 56 are provided with respective actuating rods 63, 64 and 65. Each rod may be independently actuated by a respective electromagnet 66, 67, 68 to draw the wedge controlled thereby forwardly against the action of the spring 62 linked to this wedge. As soon as such an action ceases, the wedge is returned by its spring into the normal or rest position shown.

The forward movement of the wedge 59 will cause a certain upward movement of the member 52 and the ribbon carrier 53, resulting in a change of track from black to green. A similar movement of the wedge 60 will cause a more substantial upward movement of the ribbon, for example by double the previous distance, and therefore there now occurs a shift to the blue track of the ribbon. Actuation of the wedge 61 will in turn cause a still greater upward movement, for instance by three track widths, thus causing printing through the red track. One should notice that the mechanism as described does not exclude an upward movement simultaneously controlled by two or even by three of the wedges. It is obvious, however, that it is the wedge having the greatest slope which will govern in such case the color of the letters typed. Each rod 63, 64 and 65 is articulated to the plunger of its electromagnet 66, 67 or 68. This articulation is intended to afford sufficient play for the upward movement of support 57. The electromagnets 66, 67 and 68 have each one terminal connected to a common battery 240. The leads 69, 70 and 71 from the other terminals of the three electromagnets are individually connected, as will be described, to an electro-mechanical control device 72, forming part of the mechanism 14 of Fig. 1, which is actuated through four input terminals 73, 74, 75 and 76.

In this device, the terminal 73 is connected only to the lead 71 of the electromagnet 68. Externally, the terminal 73 is multipled to all the wires 19 coming from the service keyboard, including those connected to the specialized keys 705, 706 and 707 thereof.

The device 72 is essentially constituted by two relays 77 and 84.

The relay 77 comprises a winding 78 and two associated armatures 79 and 80 reset by a spring 279. The armature 79 has two back contacts 82 and 83. The armature 80 has a front contact 81 which is connected to ground.

One of the terminals of the winding 78 is connected on the one hand to the input terminal 74 and on the other hand to the armature 80 associated with the make contact 81; the other terminal of this winding is connected to a back contact 85 of an armature 87 of relay 84. Contact 82 is connected to lead 70 of the electromagnet 67, whereas contact 83 is tied to terminal 75.

The relay 84 comprises a winding 86 whose aforementioned armature 87 is reset by a spring 287. One of the poles of the winding 86 is connected through a battery 140 to ground, the other pole being connected to the input terminal 76.

The terminal 74 is connected to the wire 19 coming from "small capitals" key 705 of the service keyboard 700. Terminal 75 is multipled to the wires 19 originating from all the collateral keys of keyboard 600. Terminal 76 is connected to the wires 19 of the "large capitals" key 706 and of the "lower case" key 707 of the service keyboard 700.

The operation of the complete arrangement shown in Fig. 5 may now be described as follows:

In the rest position, the windings 78 and 86 are not energized. The electromagnets 66, 67 and 68 are similarly unoperated. The wedges 59, 60 and 61 are in their normal positions shown. The member 52 is in its lowermost position, the ribbon operating therefore on the black track.

The operator depresses any one of the keys of the main keyboard 500, Fig. 1. None of these keys being provided with an outgoing wire 19, typing proceeds in black as none of the terminals 73—76 is grounded at this time.

Assume, now, that the operator depresses any one of the keys of the service keyboard 700. Through terminal 73 and lead 71, the electromagnet 68 is energized. The wedge 61 is attracted and the ribbon is brought to its uppermost position. The service sign will be impressed in red. As soon as the depressed key is released, the electromagnet 68 no longer receives current and the wedge 61 restores the ribbon to the black track if neither of the two other wedges has been previously attracted. It will be apparent that, inasmuch as several wedges may be displaced concurrently in the mechanism described, a shifting to the red track may also be made from a position of the ribbon carrier 52 corresponding to either the green or the blue track.

The keys 705 to 707 of the service keyboard, besides acting on wedge 61 as set forth above, will cause the additional effects described hereinafter.

If the "small capitals" key 705 is actuated, terminal 74 is grounded so that winding 78 and electromagnet 66 are energized in series in a circuit extending to battery 240 by way of break contact 85. The ribbon rises to the green track. As the winding 78 becomes energized, armature 80 makes it contact 81 while armature 79 leaves the contacts 82 and 83. The closing of the contacts 80, 81 establishes a holding circuit for winding 78 and consequently also for electromagnet 66. The wedge 59 will therefore remain in its forward position. Thus, after the sign "small capitals" will have been typed in red during the momentary displacement of wedge 61, all the following characters will be typed via the green track of the ribbon.

If, however, either of the keys 706 ("large capitals") or 707 ("lower case") is depressed, the wedge 61 will again be temporarily actuated and the corresponding sign be typed in red on the copy, on the one hand, but, on the other hand, the winding 86 will concurrently be energized through terminal 76 and therefore will disconnect the winding 78 at contact 85. The holding circuit for winding 78 and electromagnet 66 is thus interrupted and the green-track position of ribbon carrier 52 will be disestablished by the resetting of wedge 59. The ribbon, therefore, comes back to the black track upon cessation of the impulse. If the circuit had already been open at contact 81, the energization of winding 86 would have been without effect.

A depression of one of the collateral keys of the keyboard 600 applies a ground to terminal 75 of device 72 but not to terminal 73, hence the electromagnet 68 will remain de-energized and the ribbon is not moved to the red track. Two situations are possible. If the winding 78 was previously energized to lock the relay 77 operated, the circuit of magnet 67 is open at contact 83 connected to the input terminal 75. The depression of a collateral key remains thus without effect upon the ribbon-control mechanism of Fig. 5. This is necessary because such operation can only be the result of an erroneous operation on the keyboard assembly since, in the present arrangement, a collateral key cannot be operatively depressed when the system is in the position "small capitals." Such an operation would require the provision of a fifth color on the ribbon, a modification which will be understood to come broadly within the scope of the invention. It will be seen therefore that the illustrated embodiment provides safeguards against false operation of the keyboards of the machine, as described above. With the relay 77 unoperated, on the other hand, the depression of a collateral key is legitimate and, by grounding the terminal 75, closes the energization circuit of the electromagnet 67 through contacts 82 and 83 to cause the displacement of the ribbon to its "blue" position for the period during which the collateral key is held actuated.

It will be understood that the three wedges 59, 60, 61 could also be replaced by a single wedge having a sloping surface without discontinuities, the upward movement of the ribbon carrier 52 being then controlled by the extent of the horizontal displacement as determined by the depressed key.

Figure 6:
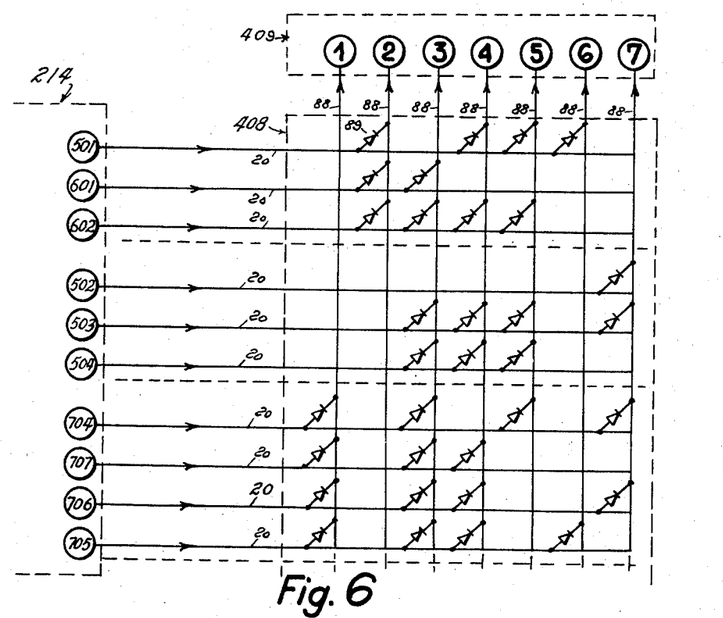
Fig. 6 is a partial view of an embodiment of the coding device.

A specific embodiment of the coder 408, Fig. 1, represented schematically in Fig. 6. The circuits there shown are generally similar to those well known in arithmetical computers. The wires 20 coming from the distributor 214 reach the coder 408 where they form rows of an orthogonal network whose columns are constituted by conductors 88 individually connected to respective punch-actuating electromagnets of the perforator 409. Let us consider a numerical perforating coder with seven elements, therefore seven electromagnets, designated from (1) to (7), and therefore seven columns 88 in each matrix shown. For the sake of simplicity, there has been shown a reduced number of horizontal conductors 20 connected to respective keys identified in the figure. The first row represents the circuit of the spacing bar 501 of the keyboard 500 (see also Fig. 7); any depression of this bar should, it is to be understood, invariably leave a mark on the recording tape. The two following rows relate to signs carried by some of the keys 601, 602 of the collateral keyboard 600, the three next rows are associated with keys 502, 503, 504 of the main keyboard 500, and the four lowermost rows deal with signs carried by certain keys 704 and 707, 706, 705 of the service keyboard 700. The circuitry of the coder will be readily apparent. Each numerical perforation code is defined by the distribution of the rectifying connections between a particular row and one or more columns, these connections being made in the well-known manner by means of unidirectionally conducting elements 89 such as, for example, crystal diodes.

Figure 7:
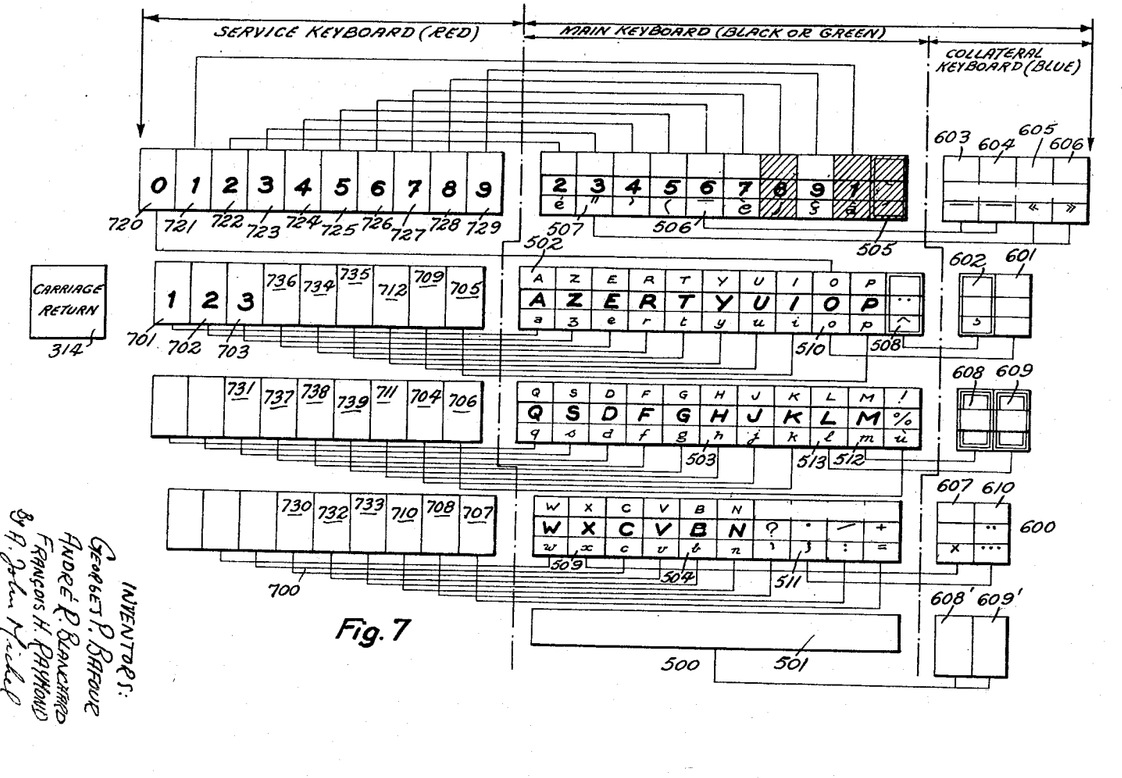
Fig. 7 shows an example of the arrangement of the keyboard system established in accordance with features of the invention.

Before giving an example of a seven-element code applicable to a system according to the invention, and while recalling that the number of digits is in no way limitative of the scope of the invention, we may consider Fig. 7 which represents in greater detail the keyboards 500, 600 and 700.

It will be understood that these keyboards need not be individual units, as shown in Fig. 1, but may in fact be subdivisions of an overall keyboard (hereinafter referred to as the keyboard assembly) as indicated by dot-dash lines in Fig. 7.

In Fig. 7, the keys of the auxiliary keyboards 600 and 700 are shown tied to respective keys of the main keyboard 500 by connecting lines symbolizing linkages whereby actuation of any of these auxiliary keys will result in the printing of a particular character on the typewritten copy, this character appearing in blue (as a capital letter or a sign in the "shift" position) for a collateral key and in red for a service key. If the corresponding key of the main keyboard 500 is depressed, the same character is typed in black or, if the "small capitals" key 705 is operative, in green. Thus, for example, the depression of the "small capitals" key 705 of the service keyboard will cause the printing in red on the typed copy of a capital P, while that of the "italics" key 701 will cause the impression in red of a capital K.

The main keyboard 500 is arranged in a way similar to that of the usual keyboard of a typewriter. In the example shown, it comprises nevertheless a few modifications.

The numeral "1" is distinguished typographically from the lower-case letter "l" which is ordinarily employed for representing it in typing. The typographic sign representing the numeral "1" is provided in the capital-leter or shift position of the key which carries the sign "à" in the lower-case or unshift position.

The sign "__", representing the underscore in typing, is not usually needed in typography where a variety of special characters are employed for similar purposes, usually the italic characters, hence this sign may be suppressed. At the end of the upper row of the main keyboard 500 there is a "dead" key 505, i.e. one that does not cause the carriage of the typewriter to advance during the printing of the character carried thereon ("grave accent" and "acute accent").

The collateral keyboard 600 may comprise a varying number of keys. By way of example, there have been shown in Fig. 1 certain keys such as:

A key 603 for recording an "end-of-line hyphen," which corresponds on the typewritten copy (except for its blue coloring) to the sign "normal hyphen" of the key 506 with which key 603 is linked as shown; actuation of key 603 in lieu of key 506, however, produces a different perforated code or, preferably, the absence of any code since the computing part of the equipment which will scan the recording should not take any notice of the separations of words at the ends of the type lines. On the other hand, the typing of a hyphen by key 506 produces the normal perforated code on the tape.

A minus-sign key 604 for which the typographic sign is different from the hyphen; this key will produce a distinct code on the tape while producing also a normal hyphen (in blue color) on the typewritten copy, being linked with key 506 as illustrated.

Keys 605, 606 for modified open and closed quotation marks, as used in French texts, which are typographically distinct and are distinguished by different codes. These keys are interconnected with the key 507 bearing the normal quotation marks of the typewriter so that the two types of marks will not be distinguished on the type copy except for their blue color if produced by the key 605 or 606.

The key 602, bearing the sign "cedilla," which is linked with a key 508 of the keyboard 500 bearing the "circumflex" accent in the corresponding position. Thus, the typing of the cedilla will cause the perforation of a special code on the tape and the printing (in blue) of a "circumflex" accent on the typewritten copy.

A key 607, bearing the "multiplication" sign which is typographically distinct from the lower-case "x;" key 607 is linked with the "x" key 509 of the main keyboard 500.

The key 601, allotted to the numeral "zero" which is typographically distinct from the capital letter "O;" this key, linked with the "O" key 510 of keyboard 500, produces a distinct code on the tape while printing a capital "O" in blue on the typewritten copy.

A key 610 bearing two and three dots in the "shift" and "unshift" positions, respectively. This key is connected for typing purposes to the key 511 bearing a period and a semicolon in the corresponding positions while producing distinct electric perforation codes.

The list given above is not exhaustive but merely indicates the possibilities inherent in the provision of collateral keys in addition to those of the main keyboard.

Reference is now made to two pairs of collateral keys 608, 608' ("em" space) and 609, 609' (half-"em" space) likewise shown in Fig. 7.

These keys serve to introduce fixed spaces or "blanks." The keys 608, 609 are linked for typing purposes to keys of the main keyboard, for instance to keys 512 (M) and 513 (L), respectively, in their capital-letter positions. This enables the operator, when necessary, to verify on the typed copy that an "em" space or a half-"em" space has been inserted without utilization of the spacing bar 501. The other two keys 608', 609' produce the same perforation codes as their unprimed counterparts but are connected, for typing, to the spacing bar 501 so that no visible mark will be found typed on the copy if the operator considers this more convenient.

We may now broadly sum up as follows the main characteristics and the operation of the complete keyboard assembly:

Normally, actuation of any key of keyboard 500 (including spacing bar 501 but excepting the accent keys 505, 508) and of the spacing keys 608, 609 and 608', 609' will cause an advance of the carriage by one step. All the keys 502 etc. of the main keyboard cause the typing to appear in black for the "lower case" and "large capitals" positions, and in green for the position "small capitals;" the typing is direct, that it to say the character bar associated with the depressed key is actuated as in conventional typewriters. The operation of the spacing bar 501 does not cause any impression.

Operation of any collateral key causes the typing to be in blue; as the keys 608', 609' connected with the spacing bar do not cause any printing, their actuation results only in a one-step advance of the carriage. Each printing due to actuation of a collateral key appears as a character of the connected key of the main keyboard. It may be noted that, in the embodiment described, the "small capitals" positions are not utilized for the collateral keys, but this is not an inherent limitation of the system. Any principal key or collateral key causes the recording on the tape or other medium of a code which is allotted thereto; this is also true for the blank keys 608, 608', 609, 609' and for the spacing bar 501. The code of the spacing bar represents variable (justifying) spaces whereas those of the blank keys correspond to fixed (non-justifying) spaces.

The service keyboard 700 on the left-hand side of Fig. 7 is shown subdivided, by way of example, into the following groups of keys:

A group of counting keys designated 720 to 729, bearing the numerals 0 to 9, designed to enable the operator to indicate the number of a typed line which will have to be corrected later on.

A group of selector keys which includes the previously described keys 705 ("small capitals"), 706 ("large capitals") and 707 ("lower case") along with three keys 701, 702, 703 bearing the markings 1, 2 and 3 indicating different fonts; three keys 704 ("italic"), 708 ("roman") and 709 ("bold face"); and three keys 710 ("normal"), 711 ("upper") and 712 ("lower"), identifying the different type positions.

A group of announcing keys, serving to indicate, for example, impending changes in type (key 730), height of page (key 731), justification (key 732), or line spacing (key 733), as well as beginning (key 734) and end (key 735) of space for cut, word-division-test (key 736), end of paragraph (key 737), end of chapter (key 738), and end of work (key 739).

The carriage-return key 314 of Fig. 1 has also been shown in Fig. 7 but does not properly form part of any of the three keyboards 500, 600 and 700.

Each key of the service keyboard 700 is linked with a respective key of the main keyboard 500. The character printed on the typewritten copy upon the actuation of any service key will therefore be the character of the associated principal key but will appear in red. Any such actuation will consequently cause the advance of the carriage by one step. It will also effect the recording of a distinct code on the tape 410. Except for the three special keys 705, 706 and 707, whose operation has been described in detail above, the depression of any key of the service keyboard will cause automatically the typing of a capital letter (or other symbol in the "shift" position), as previously noted, without the necessity of holding the key 706 in its actuated position.

The service signals generated by the keys 720 to 729, serving to number the typewritten lines, are reproduced on the copy as regular typewritten digits and are also perforated automatically on the tape in a way that will be described later on in conjunction with Fig. 9.

Figure 8:
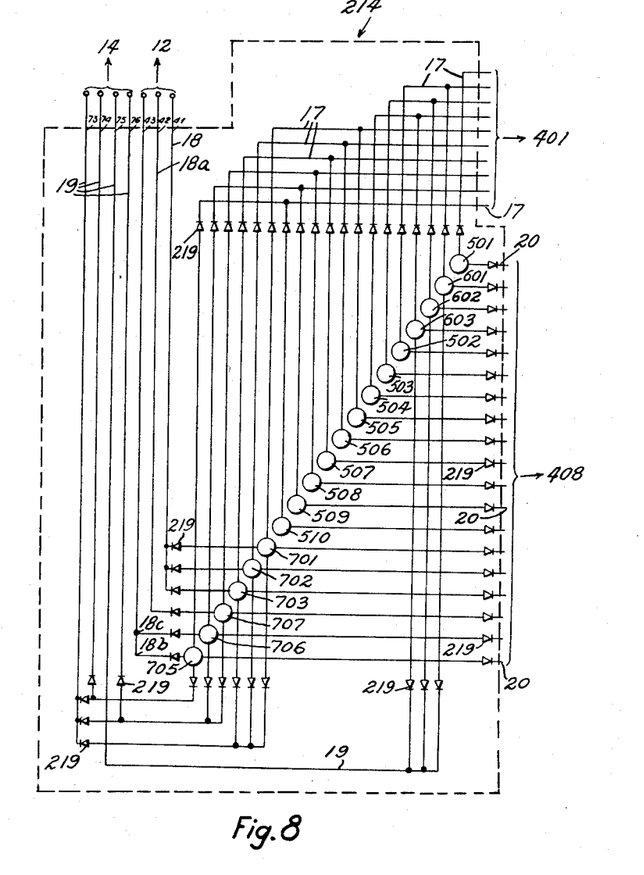
Fig. 8 shows an example of the distribution of electrical connections.

From an examination of the keyboard assembly and of its operation previously described, it appears that not all keys of the keyboard are actually equipped with the four connections shown in Fig. 2 for a standard key. By referring to the distributor 214 shown with its electric connections in Fig. 8, the extent of which has been limited for the sake of clarity but which shows all the typical cases occurring in the distributor, it will be seen that:

Each one of the principal keys 501 (spacing bar) to 510, the collateral keys 601 to 603 and the service keys 701 to 703 and 705 to 706, indicated in the figure by way of example, has an individual connection 20 extending towards the coder 408 (cf. Fig. 6).

Each one of the illustrated keys is also provided with an individual connection 17 extending towards the bars 37 (cf. Fig. 3) which constitute the type-face assembly 401, certain of these connections being multipled, as shown, in the manner and for the purposes previously described.

Each one of the collateral keys 601—603 is also provided with a connection 19 extending towards the ribbon-control mechanism 14 (cf. Fig. 5), ending at the terminal 75 of this mechanism.

Each one of the keys of the service keyboard 700, including the keys 705, 706 and 707, has a similar connection 19 extending towards terminal 73 of the ribbon-control mechanism 14; the key 705 has an additional connection 19 leading towards terminal 74 of this mechanism, whereas the keys 706 and 707 have similar additional connections ending at terminal 76 of the same mechanism.

The keys 701—703 have moreover connections 18 leading to terminal 41 of the shift mechanism 12 (cf. Fig. 4) whereas terminal 42 of the same mechanism is provided with a similar connection 18a coming from key 707; finally, terminal 43 of this mechanism is tied to corresponding connections 18b and 18c respectively extending from keys 705 and 706.

Rectifiers 219 inserted in the above-mentioned connections prevent the return flow of control currents between the circuits shown in Fig. 8.

The seven-element codes applicable to the embodiment of the invention herein disclosed may be defined as binary codes consisting only of the digits zero and one. The following Tables A, B and C are illustrative of a typical code system of this description, the reference numerals of keys previously referred to being indicated in parentheses on the left-hand side of these tables; Table D represents similar codes emitted by the numbering line counter 11 (cf. Fig. 9).

TABLE A
Main keyboard 500

| Keys | | Elements of the code | | | | | | |
|---|---|---|---|---|---|---|---|---|
| | | 1 | 2 | 3 | 4 | 5 | 6 | 7 |
| (502) | A/a | 0 | 0 | 0 | 0 | 0 | 0 | 1 |
| | E/e | 0 | 0 | 0 | 0 | 0 | 1 | 0 |
| | I/i | 0 | 0 | 0 | 0 | 1 | 0 | 0 |
| (510) | O/o | 0 | 0 | 0 | 0 | 1 | 1 | 1 |
| | U/u | 0 | 0 | 0 | 0 | 1 | 1 | 0 |
| (509) | X/x | 0 | 0 | 0 | 1 | 0 | 1 | 0 |
| | Y/y | 0 | 0 | 0 | 1 | 0 | 1 | 1 |
| | T/t | 0 | 0 | 0 | 1 | 0 | 0 | 0 |
| | J/j | 0 | 0 | 0 | 1 | 1 | 0 | 1 |
| | Q/q | 0 | 0 | 0 | 1 | 1 | 1 | 0 |
| | Z/z | 0 | 0 | 0 | 1 | 1 | 1 | 0 |
| | S/s | 0 | 0 | 1 | 0 | 0 | 0 | 1 |
| | R/r | 0 | 0 | 1 | 0 | 0 | 1 | 0 |
| | N/n | 0 | 0 | 1 | 0 | 1 | 0 | 0 |
| (513) | L/l | 0 | 0 | 1 | 1 | 0 | 0 | 0 |
| | D/d | 0 | 0 | 1 | 0 | 0 | 1 | 1 |
| | C/c | 0 | 0 | 1 | 0 | 1 | 0 | 1 |
| (512) | M/m | 0 | 0 | 1 | 0 | 1 | 1 | 0 |
| | P/p | 0 | 0 | 1 | 1 | 0 | 0 | 1 |
| | V/v | 0 | 0 | 1 | 1 | 0 | 1 | 0 |
| (504) | B/b | 0 | 0 | 1 | 1 | 1 | 0 | 0 |
| | F/f | 0 | 0 | 1 | 0 | 1 | 1 | 1 |
| | G/g | 0 | 0 | 1 | 1 | 0 | 1 | 1 |
| (503) | H/h | 0 | 0 | 1 | 1 | 1 | 0 | 1 |
| | K/k | 0 | 0 | 1 | 1 | 1 | 1 | 0 |
| | W/w | 0 | 0 | 1 | 1 | 1 | 1 | 1 |
| (505) | ./, | 0 | 1 | 1 | 1 | 1 | 1 | 0 |
| | 1/à | 0 | 1 | 1 | 0 | 0 | 0 | 1 |
| | 2/é | 0 | 1 | 1 | 0 | 0 | 1 | 0 |
| (507) | 3/" | 0 | 1 | 1 | 0 | 0 | 1 | 1 |
| | 4/' | 0 | 1 | 1 | 0 | 1 | 0 | 0 |
| | 5/( | 0 | 1 | 1 | 0 | 1 | 0 | 1 |
| (506) | 6/- | 0 | 1 | 1 | 0 | 1 | 1 | 0 |
| | 7/è | 0 | 1 | 1 | 0 | 1 | 1 | 1 |
| | 8/) | 0 | 1 | 1 | 1 | 0 | 0 | 0 |
| | 9/ç | 0 | 1 | 1 | 1 | 0 | 0 | 1 |
| (508) | :/^ | 0 | 1 | 1 | 1 | 0 | 1 | 0 |
| | !/%/ü | 0 | 1 | 0 | 0 | 1 | 0 | 0 |
| | ?/¡ | 0 | 1 | 0 | 0 | 0 | 0 | 1 |
| (511) | ./; | 0 | 1 | 0 | 0 | 0 | 1 | 0 |
| | //; | 0 | 1 | 0 | 0 | 0 | 0 | 0 |
| | +/= | 0 | 1 | 0 | 0 | 0 | 0 | 1 |
| (501) | Spacing bar | 0 | 1 | 0 | 1 | 1 | 1 | 0 |

TABLE B
Collateral keyboard 600

| Keys | | Elements of the code | | | | | | |
|---|---|---|---|---|---|---|---|---|
| | | 1 | 2 | 3 | 4 | 5 | 6 | 7 |
| (601) | zero | 0 | 1 | 1 | 0 | 0 | 0 | 0 |
| (609, 609') | half-"em" space | 0 | 1 | 1 | 1 | 0 | 0 | 0 |
| (602) | cedilla | 0 | 1 | 1 | 1 | 1 | 0 | 0 |
| (608, 608') | "em" space | 0 | 1 | 0 | 1 | 0 | 0 | 0 |
| (603) | end-of-line hyphen | 0 | 1 | 0 | 0 | 0 | 1 | 0 |
| (604) | minus sign | 0 | 1 | 0 | 0 | 0 | 1 | 1 |
| (605) | open parenthesis « | 0 | 1 | 0 | 1 | 1 | 0 | 0 |
| (606) | closed parenthesis » | 0 | 1 | 0 | 0 | 1 | 1 | 1 |
| (607) | multiplication sign | 0 | 1 | 0 | 1 | 0 | 1 | 0 |
| (610) | two dots/three dots | 0 | 1 | 0 | 0 | 1 | 1 | 0 |

TABLE C
Service keyboard 700

| Keys | | Elements of the code | | | | | | |
|---|---|---|---|---|---|---|---|---|
| | | 1 | 2 | 3 | 4 | 5 | 6 | 7 |
| (720) | 0 | 1 | 0 | 0 | 0 | 0 | 0 | 0 |
| (721) | 1 | 1 | 0 | 0 | 0 | 0 | 0 | 1 |
| (722) | 2 | 1 | 0 | 0 | 0 | 0 | 1 | 0 |
| (723) | 3 | 1 | 0 | 0 | 0 | 0 | 1 | 1 |
| (724) | 4 | 1 | 0 | 0 | 0 | 1 | 0 | 0 |
| (725) | 5 | 1 | 0 | 0 | 0 | 1 | 0 | 1 |
| (726) | 6 | 1 | 0 | 0 | 0 | 1 | 1 | 0 |
| (727) | 7 | 1 | 0 | 0 | 0 | 1 | 1 | 1 |
| (728) | 8 | 1 | 0 | 0 | 1 | 0 | 0 | 0 |
| (729) | 9 | 1 | 0 | 0 | 1 | 0 | 0 | 1 |
| (710) | Normal | 1 | 0 | 1 | 0 | 0 | 0 | 0 |
| (712) | Lower | 1 | 0 | 1 | 0 | 0 | 0 | 1 |
| (711) | Upper | 1 | 0 | 1 | 0 | 0 | 1 | 0 |
| (708) | Roman | 1 | 0 | 1 | 0 | 1 | 0 | 0 |
| (704) | Italic | 1 | 0 | 1 | 0 | 1 | 0 | 1 |
| (709) | Bold-face | 1 | 0 | 1 | 0 | 1 | 1 | 0 |
| (707) | Lower case | 1 | 0 | 1 | 1 | 0 | 0 | 0 |
| (706) | Large capitals | 1 | 0 | 1 | 1 | 0 | 0 | 1 |
| (705) | Small capitals | 1 | 0 | 1 | 1 | 0 | 1 | 0 |
| (701) | 1 | 1 | 0 | 1 | 1 | 1 | 0 | 0 |
| (702) | 2 | 1 | 0 | 1 | 1 | 1 | 0 | 1 |
| (703) | 3 | 1 | 0 | 1 | 1 | 1 | 1 | 0 |
| (730) | Change in type | 1 | 1 | 0 | 0 | 0 | 0 | 0 |
| (731) | Change in height of page | 1 | 1 | 0 | 0 | 0 | 0 | 1 |
| (732) | Change in justification | 1 | 1 | 0 | 0 | 0 | 1 | 1 |
| (733) | Change in line spacing | 1 | 1 | 0 | 0 | 0 | 1 | 0 |
| (734) | Beginning of space for cut | 1 | 1 | 0 | 0 | 1 | 0 | 0 |
| (735) | End of space for cut | 1 | 1 | 0 | 0 | 1 | 0 | 1 |
| (736) | Word-division-test | 1 | 1 | 0 | 0 | 1 | 1 | 0 |
| (737) | End of paragraph | 1 | 1 | 0 | 1 | 0 | 0 | 0 |
| (738) | End of chapter | 1 | 1 | 0 | 1 | 0 | 0 | 1 |
| (739) | End of work | 1 | 1 | 0 | 1 | 0 | 1 | 0 |

TABLE D
Line counter 11

| | Keys | Elements of the code | | | | | | |
|---|---|---|---|---|---|---|---|---|
| | | 1 | 2 | 3 | 4 | 5 | 6 | 7 |
| Numbering of lines | Digit 0 | 1 | 1 | 1 | 0 | 0 | 0 | 0 |
| | Digit 1 | 1 | 1 | 1 | 0 | 0 | 0 | 1 |
| | Digit 2 | 1 | 1 | 1 | 0 | 0 | 1 | 0 |
| | Digit 3 | 1 | 1 | 1 | 0 | 0 | 1 | 1 |
| | Digit 4 | 1 | 1 | 1 | 0 | 1 | 0 | 0 |
| | Digit 5 | 1 | 1 | 1 | 0 | 1 | 0 | 1 |
| | Digit 6 | 1 | 1 | 1 | 0 | 1 | 1 | 0 |
| | Digit 7 | 1 | 1 | 1 | 0 | 1 | 1 | 1 |
| | Digit 8 | 1 | 1 | 1 | 1 | 0 | 0 | 0 |
| | Digit 9 | 1 | 1 | 1 | 1 | 0 | 0 | 1 |

The above code system may, of course, be extended at will to accommodate more complex modifications of service keyboard 700 and of the collateral keyboard 600.

Figure 9:
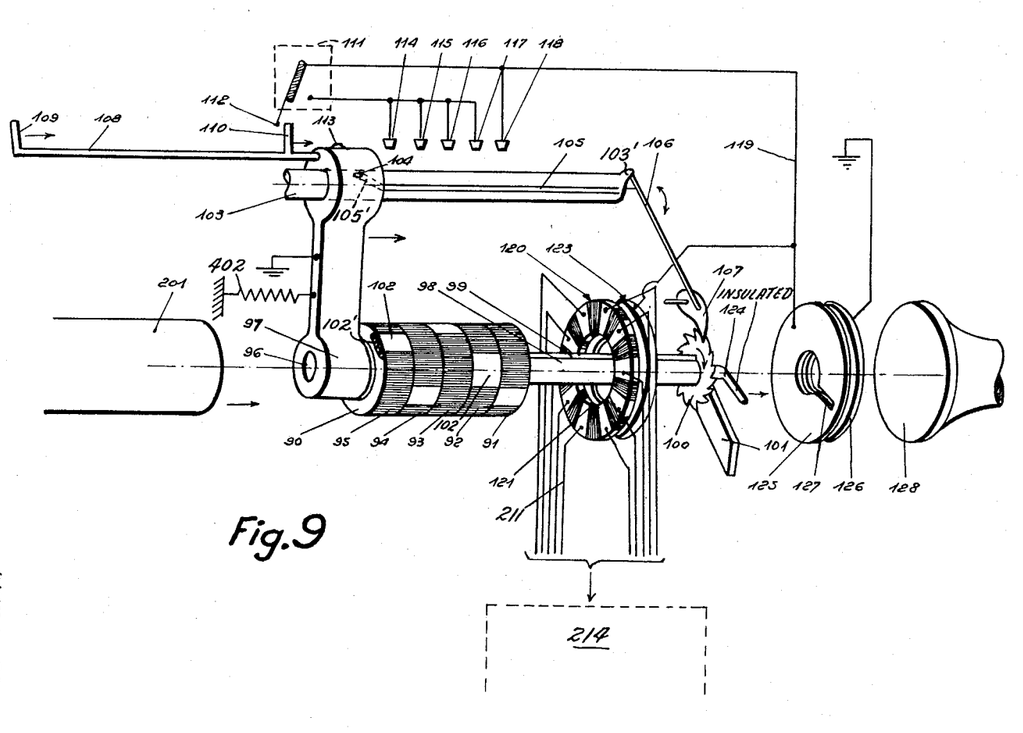
Fig. 9 shows an embodiment of a numbering line counter for identifying the typed lines.

The numbering line counter 11 may by way of illustration be constructed in the manner schematically shown in Fig. 9. In this figure, there has been indicated a mechanical numbering device 90 of conventional type, e.g. as utilized for consecutively numbering printed forms and the like. The meter 90 comprises five wheels 91, 92, 93, 94, 95 corresponding respectively to units, tens, hundreds, thousands and tens of thousands. The wheels 91 to 95 follow one another from right to left. The internal mechanism of the numbering device need not be described here in detail since it is well known per se. It will be understood that for each unit the wheel 91 accomplishes a tenth of a revolution. After a complete revolution, it causes the advance of the wheel 92 for the tens by a tenth of a turn and so on. The numbering device 90 is carried on a shaft 96, mounted on a supporting arm 97 located adjacent the wheel 95.

On the side remote from arm 97, a second shaft 98 is positioned coaxially with shaft 96 but is independent of the latter. The shaft 98 serves to control the counting movement by means of a key 99 which extends longitudinally on the shaft 98 and slides with it in a ratchet 100. This ratchet is carried on a support 101 and co-operates with a pawl 107 by which it is unidirectionally rotatable as indicated by the arrow. Units wheel 91 is engaged by the key 99 so as to rotate with shaft 98.

Unlike the gears of conventional counters, the wheels 91–95 of the device 90 do not have engraved faces. They are provided on their peripheries with insulating coatings or inlays each extending over nine-tenths of a cylindrical surface, thus leaving free on each wheel a conductive sector 102 equal to one tenth of its circumference. These metallic sectors are insulated from ground for instance by being partly surrounded by a nonconductive substance as indicated at 102'. The digit represented by any of the wheels is characterized by the angular position of its conductive sector 102.

The assembly 90, consisting of the elements 91 to 98, constitutes a unit capable of executing a horizontal translatory movement by sliding along a guide shaft 103. Additional guide means, not shown, oppose rotation of this unit about the shaft 103.

The shaft 103 is rotatably journaled in its bearings (not shown) and its rotary movement is controlled by a peg 104 which projects inwardly from arm 97 toward shaft 103 and slides in a groove 105 of that shaft. This groove has a helicoidal bend 105' while being otherwise rectilinear. The right-hand extremity of shaft 103 is formed with a lug 103' which engages a rod 106 controlling, in turn, the pawl 107 associated with the ratchet 100.

On the top portion of arm member 97 there is mounted a rod 108 provided with two fingers 109 (on the left-hand side) and 110 (on the right-hand side). The distance between these fingers is equal to the maximum displacement of arm 97. The two fingers 109, 110 alternately engage a lever 112 to operate a circuit breaker 111 which always remains in the position in which it has last been set. Thus, when the arm 97 reaches the end of its leftward displacement, the finger 110 operates and the circuit breaker 111 remains open until the end of the displacement of the arm to the right when, by the action of the finger 109 on the lever 112, the circuit breaker 111 is again closed. It remains so until the arm 97 returns into its left-hand end position, and so on.

The arm 97 carries at the top a grounded boss or protuberance 113. During the horizontal movement of arm 97, boss 113 passes under a row of five contacts 114 to 118. The spacing between these aligned contacts is the same as that between the wheels 91 to 95 of the counting device 90.

The four contacts 114, 115, 116 and 117 are electrically connected to one another and to one of the poles of the circuit breaker 111. The contact 118 on the extreme right is insulated from the four other contacts and connected both to the other pole of the circuit breaker 111 and to a lead 119.

A ring 120, fixedly secured to the frame (not shown) of the counter 90, is centered on the shaft 98 but does not make contact therewith. Its circular opening has a diameter corresponding to that of the sectors 102 of the five wheels 91–95. The ring 120 comprises ten contact segments 121 which are regularly spaced along its inner periphery and are insulated from one another and from ground. Each one of these segments is connected to a respective wire 211 leading to the distributor 214. On the right of the ring 120 there is located with slight spacing a second ring 123 of the same dimension and shape, entirely conductive on its inner periphery but insulated from ground and connected to the lead 119.

Secured to the right-hand extremity of the shaft 98 is a lug 124 insulated from ground.

Positioned coaxially with shaft 98 and to the right thereof is a ring 125 followed by another ring 126. Both rings are conductive but the ring 125 is insulated from ground whereas the ring 126 is grounded. They are normally held apart by an interposed spring (not shown) insulatingly engaging these rings, but conductive contact may be established therebetween in response to a thrust acting from the left upon the ring 125 which is also connected to lead 119.

The rings 125 and 126 have circular bores and also radial slots 127 which leave just enough space for the passage of the lug 124 in a particular angular position. This position is one which corresponds to a reading of the digit 0 on the units wheel 91. In all other angular positions of the units wheel 91, an axial displacement of this wheel into simultaneous registry with the rings 120 and 123 causes the lug 124 to push the ring 125 to the right, thereby establishing contact between rings 125 and 126.

Further to the right beyond ring 126 there is located a fixed stop 128. When the lug 124, having passed through slots 127, comes into contact with this fixed stop, the boss 113 is exactly under contact 118 and the wheel 95 bridges the two rings 120 and 123.

The assembly 90 is normally retracted by a spring 402 into its extreme left-hand position in which its wheels 91–95 are completely disengaged from the rings 120 and 123. The boss 113 is then on the left of contact 114, as shown in Fig. 9, while the finger 110 contacts the lever 112 to cause the opening of circuit breaker 111.

The effective width of each wheel 91–95, corresponding to the distance between successive operative positions of the unit 90 in which respective wheels 91–95 bridge the two rings 120 and 123, is equal to the width of a character of the typewritten text or, more precisely to the distance traversed by the typewriter carriage 201 between successive key actuations. With the unit 90 still in its retracted position, the carriage 201 near the end of its return movement strikes the arm 97 with which it is operatively aligned, as shown.

The operation of the assembly 11 for counting and numbering the lines may now be described as follows:

The typing of a line will, in the conventional manner, cause the movement of the carriage 201 towards the left. As long as the line is being typed, no action takes place in the system of the numbering line counter 11 shown in Fig. 9.

When, thereafter, the operator actuates the key 314 to effect the return of the carriage, the latter jumps back towards the right. In so moving it encounters the arm 97 so as to entrain it, in the last phase of its own motion, along the shaft 103. The finger 110 leaves lever 112 but circuit breaker 111 remains open. As soon as the unit 90 has started to move, the peg 104 exerts a camming action on the helicoidal bend 105' of groove 105 and causes the shaft 103 to be rotated slightly, thus retracting movement of the pawl 107 which falls into the next notch of ratchet 100. Pawl 107 remains in this position during the entire movement of the assembly 90 to the right-hand end of its stroke whose length is determined by the engagement of lug 124 with either ring 125 or stop 128. Upon the subsequent leftward motion of carriage 201 and counter assembly 90, the peg 104 will once more co-act with the bend 105' of groove 105 to return the shaft 103 to its original angular position, thereby causing the pawl 107 to rotate the ratchet 100 and, with it, the shaft 98 and the units wheel 91 through one-tenth of a revolution.

It should be noted that the contacts 114–117 will remain unconnected until the assembly 90 has reached the right-hand end of its maximum stroke, a position in which contact 118 is engaged by boss 113; this prevents the transmission of more than one pulse by any of the contacts 114–117, each of which is engaged twice by the boss 113 in the course of a maximum-stroke reciprocation of the counter assembly.

The ten output leads 211 of the counter 11 are so connected within the distributor 214 to the character-bar-controlling wires 17 of the numerical keys (e.g. 506, 507, 510) of the main keyboard 500 as to cause the printing of the corresponding digits on the typewritten copy, as illustrated at 301 in Fig. 1, in the same manner as if these numerical keys themselves had been operated. At the same time the corresponding perforation codes as given in Table D will be recorded on the tape.

At the beginning of operations, the first line will be identified by the single digit 1. At this time the wheels 92–95 of unit 90 are in their "0" positions whereas units wheel 91 is in its "1" position. When the operator depresses the carriage-return key 314 for the first time, preparatorily to typing the first line of the message, the lug 124 will be out of line with the slots 127 and will press the ring 125 against the ring 126 to establish conductive contact between the two rings, at the same time arresting the rightward movement of unit 90 in a position in which the units wheel 91 registers with the rings 120 and 123. Ground from lead 119 is now extended via the bridging segment of wheel 91 to the "1" segment of ring 121 and from it to the corresponding "1" wire 211 leading to distributor 214, thus causing the appearance of this digit on the typewritten copy and the perforation of the tape with the corresponding code. As the carriage 201 advances toward the left in the course of a normal typing operation, the assembly 90 reoccupies its normal position and its units wheel 91 performs one-tenth of a revolution, as previously described, to move into its "2" position. The same cycle is repeated upon each of the following eight carriage returns, the units wheel 91 moving progressively to its positions "3" through "0."

On reaching the position "0," units wheel 91 advances the tens wheel 92 by one digit in the conventional manner; at the same time the lug 124 has come to rest in alignment with the slots 127 of rings 125 and 126.

On the next carriage-return movement, the lug 124 will thus clear the rings 125, 126 and will strike the stop 128 in a position of assembly 90 in which the tens-of-thousands wheel 95 registers with the rings 120 and 123. Ground from boss 113 is now applied via contact 118 and lead 119 to ring 123 and, through segment 102 of wheel 95, to the "0" segment 121 of ring 120 and the corresponding wire 211. At the same time the finger 109 closes the circuit breaker 111, this being however without immediate effect. As the character bar bearing numeral "0" is actuated to print that digit, the carriage 201 advances one step to the left in the usual manner whereby, under the action of spring 402, the unit 90 is enabled to move leftward by a like distance so that the thousands wheel 94 now registers with the rings 120 and 123. With contact 116 now connected to lead 119, boss 113 again grounds the ring 123 and causes another impulse to be applied to "0" via 211. In like manner a further "0" is printed and perforated in the next position of counter unit 90 in which the hundreds wheel 93 is operatively aligned with rings 120 and 123. Upon the next leftward step, tens wheel 92 causes the recording of digit "1," while finally another "0" produced under the control of units wheel 91 as boss 113 grounds the contact 114. Thus, the full five-digit number 00010 is recorded at this time to indicate the tenth line of the typewritten text.

It will be apparent that the next nine operations of the counter 11 will again result in the recording of only the final digits 1–9, but that in the tenth cycle the second decade will again be registered as a five-digit number. This mode of numbering has been illustrated in Fig. 1, starting with line number 23630.

Figure 10:
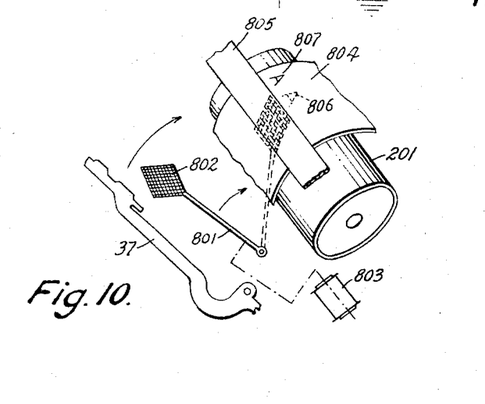
Fig. 10 is a perspective view of a modification of a detail.

Reference will now be made to Fig. 10 showing schematically a modification of the system of Fig. 5, designed to indicate the altered significance of a capital letter or other symbol by an interrupted outline rather than by a change in color as previously described. A lever 801 bears a grid 802 which, under the action of an electromagnet 803 representative of, for example, magnet 66 of Fig. 5, can be interposed between the copy sheet 804 on typewriter carriage 201 and the ribbon 805 which, in this case, need only be of a single color. When the character bar 37 strikes the ribbon 805 to print a symbol, the presence of masking grid 802 causes the character to be typed in broken rather than solid outline as respectively indicated at 806 and 807.

The invention is not limited to the embodiments described as it is capable of many modifications and adaptations which will be apparent to those skilled in the art.

What is claimed is:

1. In a message-recording system, in combination, a set of first keys, a set of second keys, a plurality of symbol-bearing members each actuatable by one of said first keys and by one of said second keys for producing a mark on a blank, characterization means selectively controlled by said keys for distinctively varying the appearance of said mark depending on whether said members are actuated by operation of a first or a second key, and mechanism for registering on a recording medium a coded entry individually identifying the operated key.

2. In a message-recording system, in combination, a first key, a second key, a type bar actuatable by operation of either of said keys for producing a mark on a blank, characterization means selectively controlled by said keys for distinctively varying the appearance of said mark in accordance with the operated key, and coder means controlled by said keys for making an entry, identifying the operated key, on a recording medium.

3. In a message-recording system, in combination, a first key, a second key, a type bar actuatable by operation of either of said keys for producing a mark on a blank, a holder for said blank, coloring means interposable between said type bar and said blank for rendering visible the mark produced by said type bar, control means for altering the position of said coloring means in a manner distinctively varying the appearance of said mark in accordance with the operated key, and coder means controlled by said keys for making an entry, identifying the operated key, on a recording medium.

4. The combination according to claim 3, wherein said coloring means comprises an ink ribbon having a plurality of differently colored zones selectively positionable in operative alignments with said type bar.

5. The combination according to claim 3, wherein said coloring means comprises an ink ribbon and a partial mask selectively interposable between said type bar and said holder along with said ribbon.

6. The combination according to claim 3, wherein said type bar is provided with an electrical actuating device and wherein each of said keys comprises a movable arm, resilient means tending to maintain said arm in an unoperated position, a spring contact adapted to be resiliently depressed by said arm in an operated position, and a set of conductors extending in parallel from said spring contact toward said coder means and said actuating device.

7. The combination according to claim 3, wherein said type bar is provided with an electrical actuating device including a swingable control member operatively coupled with said type bar, drive means adapted to impart an oscillatory motion to said control member, abutment means normally maintaining said control member out of engagement with said drive means, and electromagnetic means controlled by said keys for retracting said abutment means.

8. The combination according to claim 3, wherein said abutment means is a crescent-shaped lever.

9. The combination according to claim 3, wherein said coloring means comprises an ink ribbon having a plurailty of superposed tracks of different colors, said control means including suspension means for said ribbon and wedge-shaped supporting means for said suspension means adapted to vary the elevation of the latter.

10. In a system for recording information to control an automatic composing machine, in combination, a typewriter carriage provided with a blank-holding roller, a set of type bars adapted to print a variety of symbols on a blank carried by said roller, a keyboard having keys for the selective actuation of said type bars, mechanism for horizontally advancing said carriage in response to the operation of any of said keys, line-feeding means for restoring said carriage to a starting position and turning said roller after the completion of a line, coder means controlled by said keys for entering on a recording medium an identification of each operated key, and counter means controlled by said carriage for transmitting to said coder means a line-numbering code during each horizontal traverse of said carriage.

11. The combination according to claim 10, wherein said counter comprises contact means positioned for actuation by said roller in an extreme position of said carriage.

12. The combination according to claim 10, wherein said carriage is provided with a numbering device having means for selectively actuating certain of said type bars in a manner producing a line-numbering indication on said blank.

13. A system for recording information to control an automatic composing machine, comprising a keyboard provided with a set of principal keys and a set of service keys, a set of type bars selectively actuatable by respective ones of said keys, at least some of said type bars being actuatable in identical fashion by the operation of both a principal key and a service key in the alternative, a typewriter carriage having blank-holding means, coloring means having different portions selectively positionable under the control of said keys in operative alignment with said type bars for enabling the latter to produce, on a blank held by said carriage, visible marks identified by their appearance as having been caused by the operation of either a principal key or a service key, and coder means controlled by said keys for registering on a recording medium successive entries individually identifying the operated keys.

14. A system according to claim 13, wherein said coloring means has at least three distinct operating positions, said service keys including a first selector key, operable to move said coloring means into a first position during the actuation of its associated type bar and thereafter to maintain said coloring means in a second position, and a second selector key, operable to move said coloring means into said first position during the actuation of its associated type bar and thereafter to maintain said coloring means in a third position, whereby further differentiation in the marks produced by subsequently actuated type bars is obtained.

15. A system according to claim 13, wherein said coloring means is an ink ribbon provided with at least three differently colored, parallel tracks including a first and a second track for said principal keys and a third track for said service keys, said service keys including a first selector key, operable to move said ribbon into operative positioning of said third track during the actuation of its associated type bar and thereafter to maintain said ribbon in operative position of said first track, and a second selector key, operable to move said ribbon into operative positioning of said third track during actuation of its associated type bar and thereafter to maintain said ribbon in operative position of its second track, whereby further differentiation in the marks produced by the subsequent operation of principal keys is obtained.

16. A system according to claim 15, wherein each of said type bars is provided with a lower and an upper type face, further comprising shift means for rendering either of said type faces operative by varying the relative alignment between said holder and said type bars, said service keys including a third selector key arranged to operate said ribbon in the same manner as said first selector key, said first and third selector keys being connected to said shift means for locking said holder and said type bars in shifted and in unshifted position, respectively.

17. A system according to claim 16, wherein said third selector key is provided with means for controlling said shift means to place said holder and said type bars momentarily in shifted position, during actuation of the type bar associated with said third selector key, prior to locking them in unshifted position.

18. A system according to claim 16, wherein said keyboard is further provided with at least one collateral key connected to actuate one of said type bars, said ribbon having a fourth track operatively positionable upon the operation of said collateral key.

19. A system according to claim 18, further comprising lockout means controlled by said selector keys for blocking said collateral key after the operation of said second selector keys and for unblocking said collateral key after the operation of either of the other selector keys.

20. A system according to claim 19, wherein said ribbon is provided with means for returning it to operative position of its first track following the actuation of the type bar associated with said collateral key.

21. A system according to claim 18, wherein said keyboard further includes a special key operable to advance said carriage without actuation of any type bar and to transmit to said coder means a signal for registering a spacing code on said recording medium, said collateral key being operable to transmit to said coder means a like signal for the registration of a spacing code concurrently with the actuation of its associated type bar.

22. A system according to claim 13, wherein said coder means includes a tape perforator.

References Cited in the file of this patent

UNITED STATES PATENTS

| | | |
|---|---|---|
| 940,709 | McFarland | Nov. 23, 1909 |
| 2,747,718 | May | May 29, 1956 |
| 2,762,485 | Bafour et al. | Sept. 11, 1956 |